United States Patent
Bartley et al.

(10) Patent No.: US 6,220,521 B1
(45) Date of Patent: Apr. 24, 2001

(54) VEHICLE HYDRAULIC SYSTEM THAT PROVIDES HEAT FOR PASSENGER COMPARTMENT

(75) Inventors: Bradley E. Bartley, Manito; James R. Blass, Bloomington; Dennis H. Gibson, Chillicothe, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/235,358

(22) Filed: Jan. 21, 1999

(51) Int. Cl.⁷ ..................................................... B60H 1/02
(52) U.S. Cl. ......................................... 237/12.3 R; 122/26
(58) Field of Search ....................... 237/12.3 R; 126/247; 122/26

(56) References Cited

U.S. PATENT DOCUMENTS

| | | |
|---|---|---|
| 4,069,972 | 1/1978 | Hausmann . |
| 4,192,456 * | 3/1980 | Shields et al. ................... 237/12.3 R |
| 4,285,200 | 8/1981 | Byrne et al. . |
| 4,352,456 | 10/1982 | Brandenberg, Jr. . |
| 4,432,493 | 2/1984 | Moser et al. . |
| 4,434,934 | 3/1984 | Moser et al. . |
| 4,487,364 | 12/1984 | Okulicz et al. . |
| 4,728,029 * | 3/1988 | Griebel et al. ................... 237/12.3 R |
| 5,031,690 * | 7/1991 | Anderson et al. ................ 165/43 |
| 5,168,703 | 12/1992 | Tobias . |
| 5,318,100 | 6/1994 | Aoki . |
| 5,333,679 | 8/1994 | Suzuki et al. . |
| 5,540,203 * | 7/1996 | Foulkes et al. .................. 123/446 |
| 5,582,151 * | 12/1996 | Wertheimer ..................... 123/435 |
| 5,678,521 | 10/1997 | Thompson et al. . |
| 5,697,546 | 12/1997 | Cicioni . |

FOREIGN PATENT DOCUMENTS

| | | |
|---|---|---|
| 35 19 650 A1 | 12/1986 | (DE) . |
| 197 11 682 | 11/1997 | (DE) . |
| 196 30 407 A1 | 1/1998 | (DE) . |
| 2 320 523 | 6/1998 | (GB) . |

\* cited by examiner

Primary Examiner—Harold Joyce
Assistant Examiner—Derek S. Boles
(74) Attorney, Agent, or Firm—Michael B. McNeil

(57) ABSTRACT

A vehicle includes a vehicle housing which defines a passenger compartment. Attached to the vehicle housing is a hydraulic system, that includes a hydraulic fluid which flows through at least one passageway within the hydraulic system. Also attached to the vehicle housing is a passenger compartment heating system. The passenger compartment heating system includes a heat exchanger, wherein a portion of the heat exchanger is a segment of the at least one passageway of the hydraulic system.

20 Claims, 3 Drawing Sheets

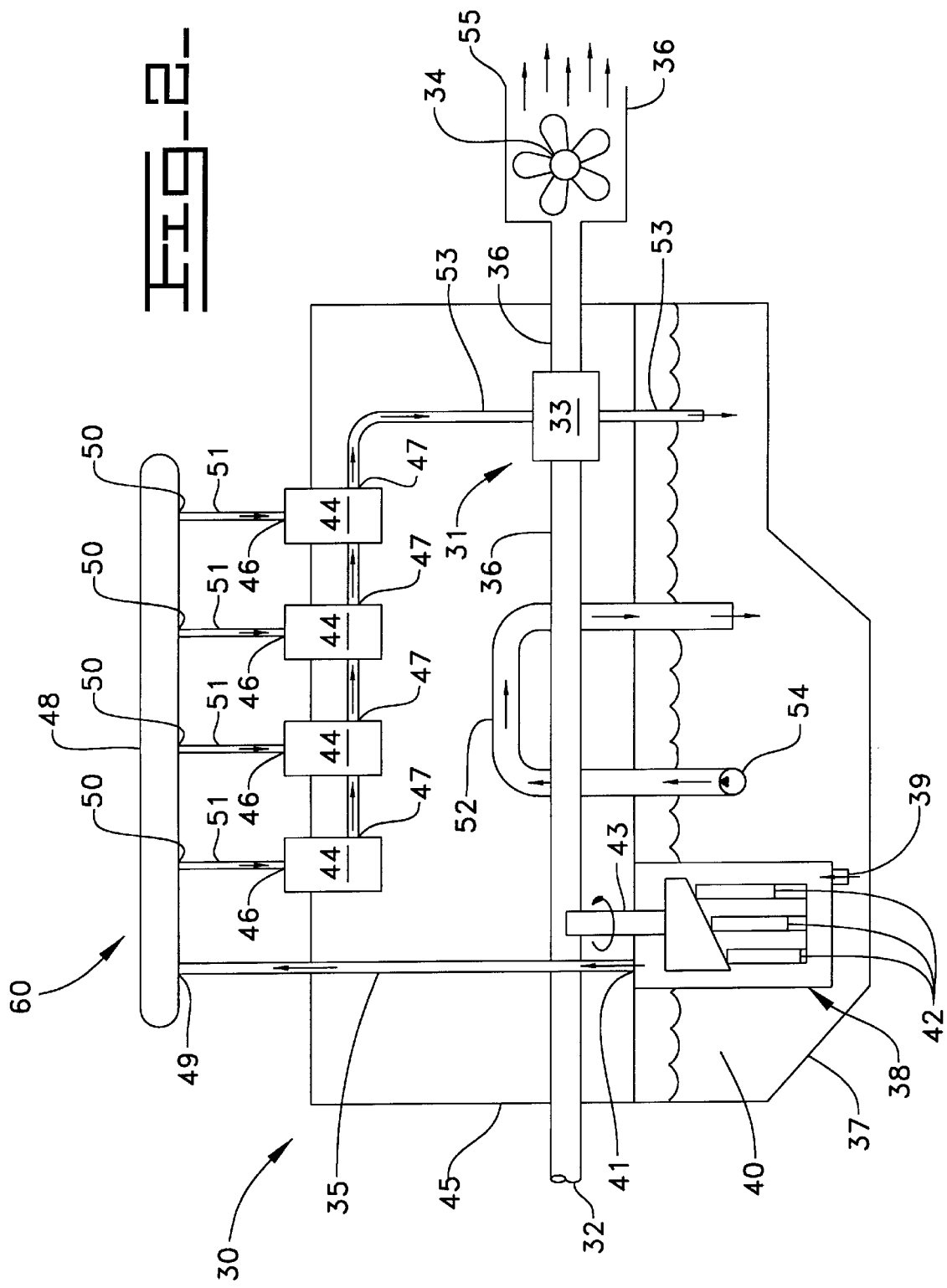

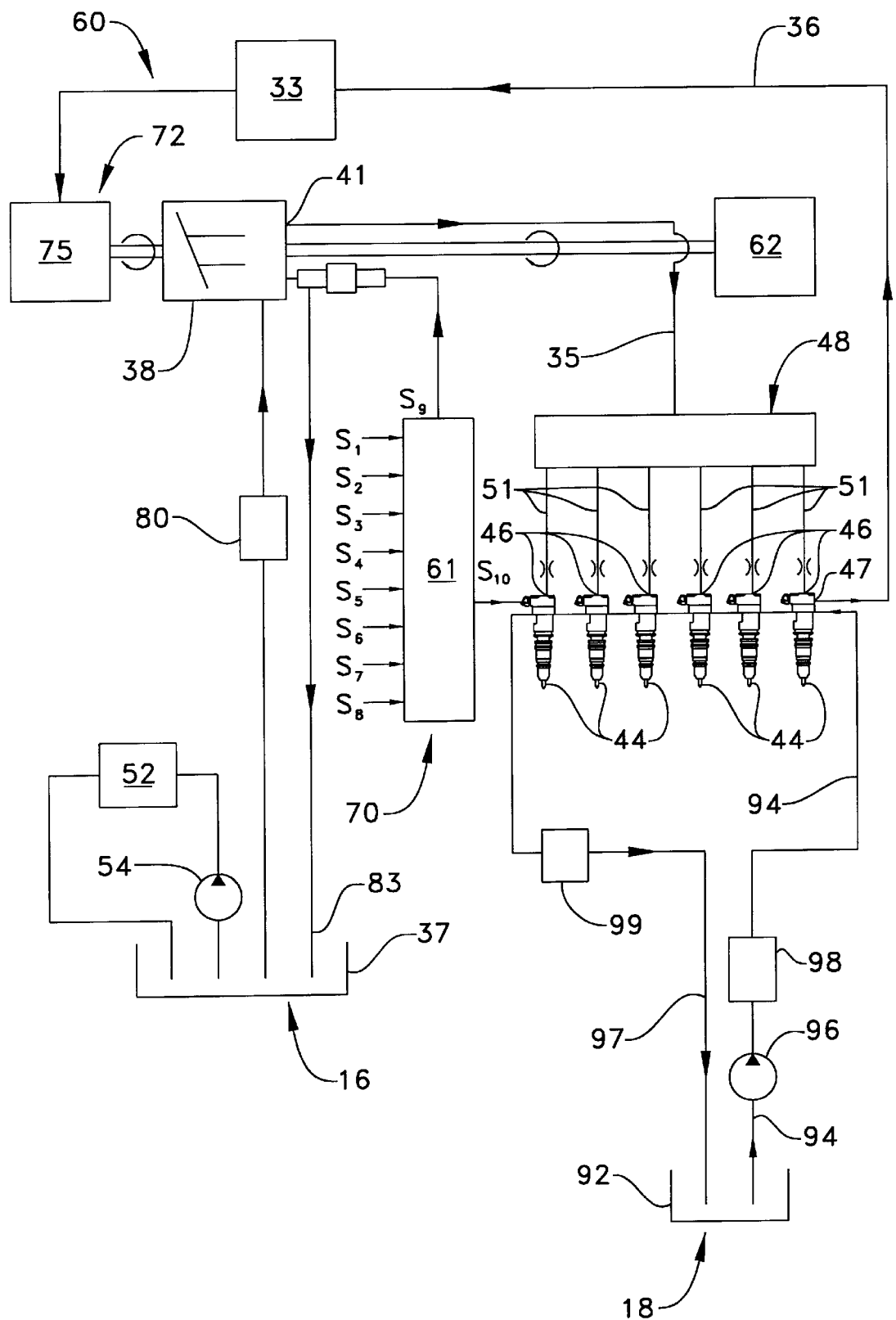
Fig_3

(1)

VEHICLE HYDRAULIC SYSTEM THAT PROVIDES HEAT FOR PASSENGER COMPARTMENT

Government License Right

The U.S. Government has a paid-up license in this invention and the right in limited circumstances to require the patent owner to license others on reasonable terms as provided for by the terms of DE-FC05-970R22605, awarded by the Department of Energy. In other words, this invention was made with Government support under DE-FC05-970R22605 awarded by the Department of Energy. The Government has certain rights in this invention.

TECHNICAL FIELD

The present invention relates generally to vehicle heating systems and more specifically to heating systems in vehicles utilizing hydraulic devices.

BACKGROUND ART

A variety of systems have been developed for heating vehicle passenger compartments. Several of these previous systems relied upon a method of drawing heat from engine coolant fluid to provide heat to a vehicle passenger compartment. The coolant fluid flows through a heat exchanger where the heat of the fluid is transferred to the air flowing toward the passenger compartment. Once the coolant fluid passes through the heat exchanger, it is returned to the engine for recirculation. Because heat from the engine operation is responsible for heating the coolant fluid, and due to the inherent properties of coolant fluids, these systems often take a substantial amount of time to provide heat to passenger compartments after a cold start. Further, because these heating systems draw heat from an additional fluid, as opposed to harnessing heat from an existing engine fluid, engines utilizing these heating systems must contain an additional pump and plumbing. While these systems have performed well, there is room for improvement.

The present invention is directed to overcoming one or more of the problems set forth above and to improving the performance of passenger compartment heating systems.

SUMMARY OF THE INVENTION

A vehicle includes a vehicle housing which defines a passenger compartment. Attached to the vehicle housing is a hydraulic system, that includes a hydraulic fluid which flows through at least one passageway within the hydraulic system. Also attached to the vehicle housing is a passenger compartment heating system. The passenger compartment heating system includes a heat exchanger, wherein a portion of the heat exchanger is a segment of the at least one passageway of the hydraulic system.

BRIEF DESCRIPTION OF THE DRAWINGS

FIG. 2 is a diagrammatic view of the engine of the vehicle of FIG. 1.

FIG. 3 is a schematic view of a hydraulically actuated fuel injection system according to one aspect of the invention.

BEST MODE FOR CARRYING OUT THE PRESENT INVENTION

Figure 1:
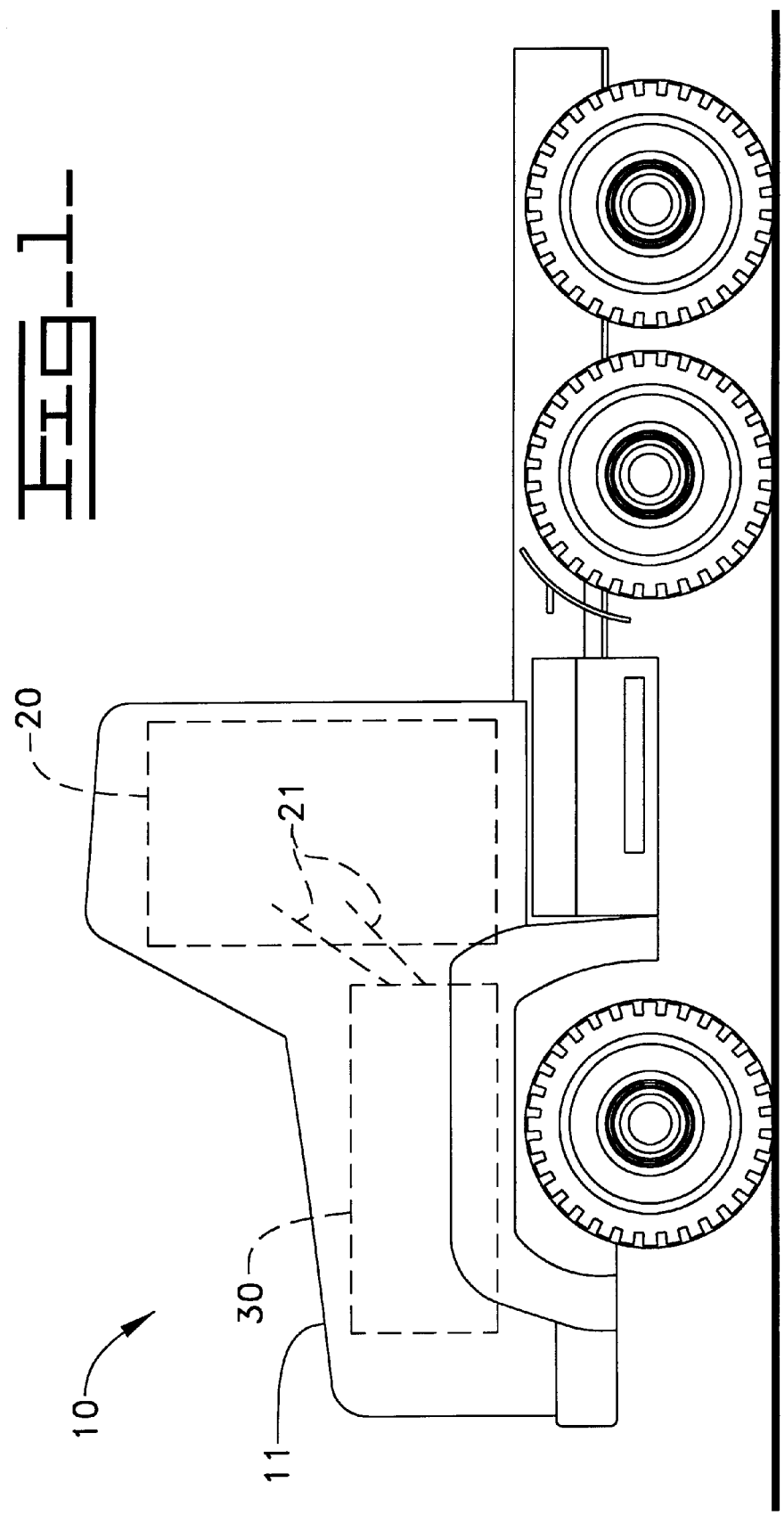
FIG. 1 is a diagrammatic representation of a vehicle according to the present invention.

Referring to FIGS. 1 and 2, there is shown a vehicle 10, in this case a truck, according to the present invention. Vehicle 10 includes a passenger compartment 20, defined by a vehicle housing 11, and an engine 30. An operator in passenger compartment 20 can control engine 30 by manipulating a set of controls 21 located in passenger compartment 20.

Referring now to FIG. 2, engine 30 includes an engine casing 45. An oil pan 37 filled with an amount of lubricating oil 40 is contained within engine 30 and defined in part by engine casing 45. A conventional lubricating system 52 is contained within engine 30, including a low pressure pump 54. Operating in parallel to lubricating system 52 is a hydraulic system 60 which preferably utilizes lubricating oil 40 as a hydraulic fluid in actuating a plurality of hydraulic devices 44. Hydraulic system 60 also includes a high pressure pump 38 which is positioned in oil pan 37 and partially submerged in oil 40. While any available engine fluid could be used by hydraulic system 60 as actuation fluid, the present invention utilizes oil 40. This allows hydraulic system 60 to be directly connected to lubricating system 52. High pressure pump 38 includes a plurality of pistons 42 which reciprocate as pump shaft 43 rotates. A pump inlet 39 is positioned on high pressure pump 38 to be near the bottom of oil pan 37 in order to always be exposed to a ready supply of oil 40. Pressurized oil exits high pressure pump 38 through an outlet 41 and flows through a high pressure supply passageway 35 to an inlet 49 of a high pressure manifold 48.

High pressure manifold 48 includes a plurality of outlets 50, each of which is connected to a respective branch passage 51. Each branch passage 51 is connected to a device inlet 46 of an individual hydraulic device 44. For the purposes of the present invention, hydraulic devices 44 can be devices attached to engine 30 as shown, such as hydraulic fuel injectors, exhaust brakes or gas exchange valves. Alternatively, hydraulic devices 44 can be devices separated from engine 30, but attached to vehicle housing 11, such as a hydraulic motor, a hydraulic mechanical device, or a hydraulic cylinder. In such an alternative, the hydraulic system could, but likely would not, share fluid with the engine's lubricating system. In the illustrated example embodiment, each hydraulic device 44 includes a device outlet 47 that empties into a return pipe 53 which allows oil 40 to return to oil pan 37 for recirculation. Oil 40 flowing through return pipe 53 has been quickly heated as a result of both work done in hydraulic devices 44 and the rising temperatures in engine 30.

The heated oil 40 flowing through return pipe 53 passes through a heating system 31 before returning to oil pan 37 for recirculation. Heating system 31 includes a heating system supply passageway 36 which has a first end 32 open to relatively cool air and a second end 55 open to passenger compartment 20. Preferably, a fan 34 is positioned in heating system supply passageway 36 and is used to force air into passenger compartment 20. Before flowing into passenger compartment 20, relatively cool air flowing through heating system supply passageway 36 passes through a heat exchanger 33. Heat exchanger 33 can be attached to any suitable location on vehicle housing 11 but is preferably located adjacent engine 30. Heat exchanger 33 transfers heat from oil 40 to the relatively cool air. The now cooler oil 40 flowing out of heat exchanger 33 is returned to oil pan 37 for recirculation via return pipe 53. As previously stated, while hydraulic system 60 has been shown as attached to engine 30, it could be attached to vehicle housing 11 but separated from engine 30, such as in the case of a bulldozer attachment.

Referring now to FIG. 3, there is shown hydraulic system 60, here a hydraulically-actuated fuel injection system, as adapted for engine 30. The fuel injection system 60 includes at least one hydraulically actuated fuel injector 44, all of which are adapted to be positioned in a respective cylinder head bore of engine 30. The fuel injection system 60 includes a source of actuation fluid 16 for supplying actuation fluid to each fuel injector 44 at a device inlet 46, and a source of fuel 18 for supplying fuel to each fuel injector 44 at a fuel inlet 22. The fuel injection system 60 also includes a means for recirculating actuation fluid 72, containing a hydraulic motor 75, which is capable of recovering hydraulic energy from oil 40 exiting fuel injectors 44. A computer 70 is also included in fuel injection system 60 to control timing and duration of injection events.

The source of actuation fluid 16 preferably includes oil pan 37, one or more actuation fluid filters 80, high pressure pump 38 for generating high pressure in oil 40, as discussed for FIG. 2, and at least one high pressure manifold 48. Pump outlet 41 of high pressure pump 38 is arranged in fluid communication with high pressure manifold 48 via supply passageway 35. Branch passages 51 connect device inlet 46 of each fuel injector 44 to high pressure manifold 48. After performing work in each fuel injector 44, oil 40 exits through device outlet 47 into return pipe 53. Oil 40 is carried to heating system 31 by return pipe 53 which acts to fluidly connect fuel injectors 44 to heat exchanger 33. After passing heat exchanger 33, a portion of the recirculated oil 40 is channeled to high pressure pump 38 and another portion is returned to oil pan 37 via return pipe 83.

The source of fuel 18 preferably includes a fuel supply regulating valve 99 and a fuel circulation and return passage 97 arranged in fluid communication between the fuel injectors 44 and the fuel tank 92. Fuel is supplied to the fuel injectors 44 via a fuel supply passage 94 arranged in fluid communication between the fuel tank 92 and the fuel inlet 22 of each fuel injector 44. Fuel being supplied through the fuel supply passage 94 travels through a low pressure fuel transfer pump 96 and one or more fuel filters 98.

The system includes a computer 70 that has an electronic control module 61 which controls the timing and duration of injection events and pressure in high pressure manifold 48. Based upon a variety of input parameters including temperature, throttle, engine load, etc. ($S_1$–$S_8$) electronic control module 61 can determine a desired injection timing and duration, and manifold pressure to produce some desired performance at the sensed operating conditions.

Industrial Applicability

Referring now to FIGS. 1, 2 and 3, oil 40 is drawn into pump inlet 39 and is pressurized by the action of reciprocating pistons 42. Pressurized oil 40 exits high pressure pump 38 via pump outlet 41 and flows through high pressure supply passageway 35 into high pressure manifold 48. This pressurized oil 40 flows into hydraulic devices 44 via a series of branch passages 51, where the pressurized oil 40 acts as a hydraulic fluid to actuate hydraulic devices 44. As oil 40 travels through hydraulic devices 44 it is heated. Oil 40, which is being used as actuation fluid in hydraulic devices 44, is the same fluid as oil 40 used to lubricate engine 30, which also heats up as it circulates through the moving parts of engine 30. The heated oil 40 exits hydraulic devices 44 through device outlets 47 and empties into return pipe 53.

Heated oil 30 flowing through return pipe 53 enters heat exchanger 33 which transfers the heat from oil 40 to the relatively cool air flowing through heating system supply passageway 36. The now relatively heated air is moved into passenger compartment 20 by fan 34 which is located in heating system supply passageway 36. Relatively cool oil 40 then exits heat exchanger 33 and flows through return pipe 53 to oil pan 37 for recirculation.

The present invention improves upon previous passenger compartment heating systems by utilizing the heated oil from the hydraulic devices to heat the air being projected into the passenger compartment. Because the temperature of the oil increases much faster than the temperature of engine coolant, the present invention can improve the performance of passenger compartment heating systems. Further, because the present system harnesses available heat from hydraulic system 60 to heat the passenger compartment, the present invention might reduce or eliminate the need for an actuation fluid cooler. In fact, heat exchanger 33 might take the place of previous actuation fluid coolers. In such a case, it might be necessary to vent heated air after the passenger compartment is up to temperature.

It should be understood that the above description is intended only to illustrate the concepts of the present invention, and is not intended to in any way limit the potential scope of the present invention. For instance, while the heat exchanger in the present invention is shown in FIG. 2 as being positioned downstream from hydraulic devices, it should be appreciated that the heat exchanger could also be located upstream from the hydraulic devices with little or no change in effectiveness. Further, while the vehicle shown in FIG. 1 is a truck, it should be appreciated that the present invention would also find application in marine vehicles. Additionally, while the present invention is shown including a hydraulic system attached to the engine which utilizes lubricating oil as actuation fluid, this could be modified. For instance, the hydraulic system could be isolated from the engine and use a separate fluid as actuation fluid or the hydraulic system could be isolated from the engine while still using the lubricating oil as actuation fluid. Thus, various modifications could be made without departing from the intended spirit and scope of the invention as defined by the claims below.

What is claimed is:

1. A vehicle comprising:
   a vehicle housing defining a passenger compartment;
   a hydraulic system attached to said vehicle housing and including a hydraulic fluid flowing through at least one passageway, wherein said hydraulic fluid is engine lubricating oil shared with an engine lubricating system;
   a passenger compartment heating system attached to said vehicle housing;
   said passenger compartment heating system including a heat exchanger; and
   a portion of said heat exchanger being a segment of said at least one passageway.

2. The vehicle of claim 1 wherein said passenger compartment heating system includes an air passageway with a first end open to relatively cool air and a second end open to said passenger compartment.

3. The vehicle of claim 1 wherein said passenger compartment heating system includes a fan positioned in an air passageway with a first end open to relatively cool air and a second end open to said passenger compartment.

4. The vehicle of claim 1 further comprising an engine attached to said vehicle housing; and
   said hydraulic system includes at least one hydraulic device attached to said engine, wherein said at least one hydraulic device is at least one hydraulic fuel injector, at least one exhaust brake or at least one gas exchange valve.

5. The vehicle of claim 1 further comprising an engine attached to said vehicle housing; and said hydraulic system includes a hydraulic device separated from said engine but attached to said vehicle housing, wherein said hydraulic device is a hydraulic motor, a hydraulic mechanical device or a hydraulic cylinder.

6. The vehicle of claim 1 further comprising an engine attached to said vehicle housing;

said engine having an oil pan; and said engine lubricating oil originating from said oil pan.

7. The vehicle of claim 1 wherein said passenger compartment includes engine controls for said vehicle.

8. A vehicle comprising:

a vehicle housing defining a passenger compartment;

an engine attached to said vehicle housing;

a hydraulic system attached to said vehicle housing and including a hydraulic fluid flowing through at least one passageway, wherein said hydraulic fluid is engine lubricating oil shared with an engine lubricating system;

a passenger compartment heating system attached to said vehicle housing, said passenger compartment heating system including a heat exchanger and an air passageway with a first end open to relatively cool air and a second end open to said passenger compartment; and a portion of said heat exchanger being a segment of said at least one passageway.

9. The vehicle of claim 8 wherein said passenger compartment heating system includes a fan positioned in said air passageway.

10. The vehicle of claim 9 wherein said passenger compartment includes engine controls for said vehicle.

11. The vehicle of claim 10 wherein said hydraulic system includes at least one hydraulic device attached to said engine, wherein said at least one hydraulic device is at least one hydraulic fuel injector, at least one exhaust brake or at least one gas exchange valve.

12. The vehicle of claim 11 wherein said hydraulic system includes a hydraulic device separated from said engine, wherein said hydraulic device is a hydraulic motor, a hydraulic mechanical device or a hydraulic cylinder.

13. The vehicle of claim 11 wherein said hydraulic system includes an electronic control module attached to said vehicle housing, and being in communication with, and capable of controlling, said at least one hydraulic device.

14. The vehicle of claim 13 wherein said engine includes an oil pan and said engine lubricating oil originates from said oil pan.

15. A vehicle comprising:

a vehicle housing defining a passenger compartment;

an engine attached to said vehicle housing;

a hydraulic system attached to said vehicle housing and including a hydraulic fluid flowing through at least one passageway, wherein said hydraulic fluid is engine lubricating oil shared with an engine lubricating system;

said hydraulic system including a hydraulic device attached to said engine;

a passenger compartment heating system attached to said vehicle housing, said passenger compartment heating system including a heat exchanger and an air passageway with a first end open to relatively cool air and a second end open to said passenger compartment; and a portion of said heat exchanger being a segment of said at least one passageway.

16. The vehicle of claim 15 wherein said hydraulic system includes an electronic control module attached to said vehicle housing, and being in communication with, and capable of controlling, said at least one hydraulic device.

17. The vehicle of claim 16 wherein said hydraulic device is at least one hydraulic fuel injector.

18. The vehicle of claim 17 wherein said engine includes an oil pan and said engine lubricating oil originates from said oil pan.

19. The vehicle of claim 18 wherein said at least one hydraulic fuel injector includes a fuel inlet fluidly connected to a source of fuel fluid, and a hydraulic fluid inlet fluidly connected to said oil pan.

20. The vehicle of claim 19 wherein said passenger compartment includes engine controls for said vehicle.

* * * * *